W. YOUNG & J. WORTHAM.
Clod-Crushers and Harrows Combined.
No. 142,755. Patented September 9, 1873.
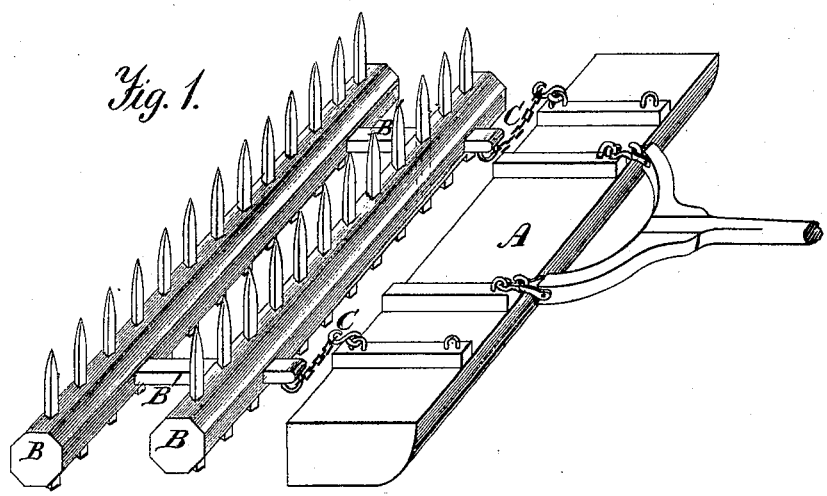
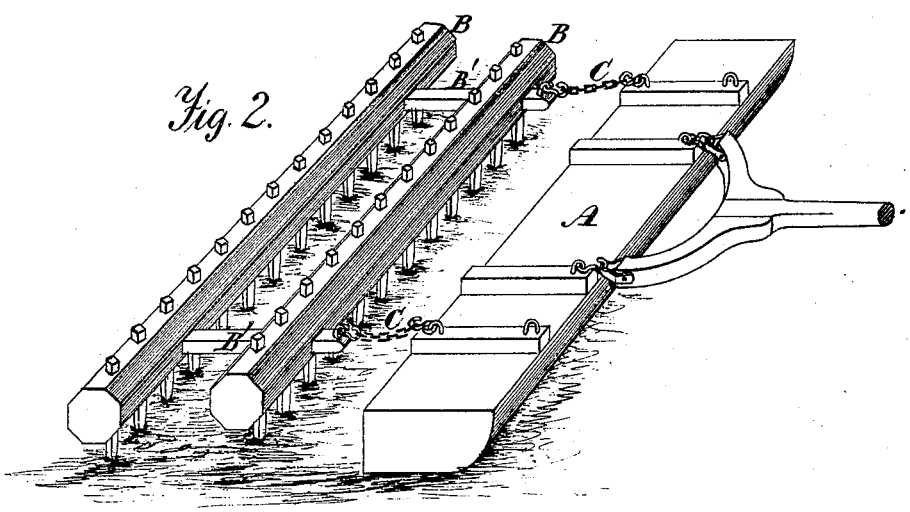
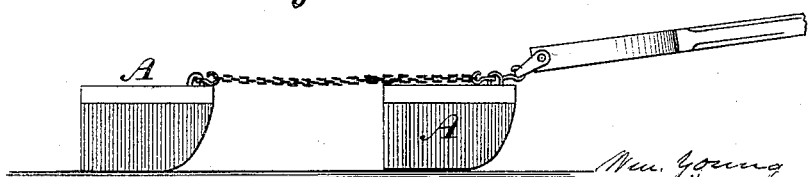
Witnesses.
A. Ruppert.
[signature]
Inventor
Wm. Young
J. Wortham
D. P. Holloway & Co
Atty

UNITED STATES PATENT OFFICE.

WILLIAM YOUNG AND JAMES WORTHAM, OF SHELBYVILLE, TENNESSEE.

IMPROVEMENT IN CLOD-CRUSHERS AND HARROWS COMBINED.

Specification forming part of Letters Patent No. 142,755, dated September 9, 1873; application filed August 8, 1873.

*To all whom it may concern:*

Be it known that we, WILLIAM YOUNG and JAMES WORTHAM, of Shelbyville, in the county of Bedford and State of Tennessee, have invented a new and useful Improved Clod-Crusher and Harrow Combined; and we do hereby declare that the following is a full, clear, and exact description of the same, reference being had to the annexed drawings making part of this specification, in which—

Figure 1 is a perspective view of the machine with the harrow inverted. Fig. 2 is a perspective view of the machine with the harrow reversed; and Fig. 3 is a longitudinal section, showing two clod crushers or rubbers.

The same letters are employed in all the figures in the designation of identical parts.

The object of this machine is to thoroughly pulverize the earth and prepare it for seeding; and the invention consists in combining one or more rubbers or sliding beams operating to crush the clods by rubbing them with a reversible harrow having the blunt end of the teeth projecting through the beams, so that by successively passing over the ground, first with the blunt ends of the teeth down and then with the pointed ends down, the earth will be thoroughly pulverized.

In the annexed drawing, A represents a rubber made of a stick of timber flat on top and half round on the bottom, or flat on the bottom and rounded in front like a sled-runner. This should be of sufficient weight to break up the clods of earth as it is dragged over them, being, say, six feet long by fifteen inches in width. To this or to the leading one, if two are used, connected by chains, as shown in Fig. 3, the tongue is attached. The harrow is formed of two parallel beams of wood, B, of the length of the rubber, which are attached to one another by connecting-pieces, as shown. The teeth are passed through these beams at intervals of, say, four inches, those in the rear beam being placed in line with the middle of the space between those in front. The blunt ends of the teeth should project about two inches on one side of the beams B, and the sharp ends about five inches on the other side. The harrow is connected to the rubber by chains fastened to the projecting ends of the ties B′, which are passed through mortises formed midway in the beams B, to permit the harrow to be run with either the blunt ends or the sharp ends of the teeth down. The harrow is to be placed with the blunt ends of the teeth down and the machine drawn over the surface of the field. Then the harrow is to be reversed and again passed over the field, by which means the clods will be completely broken up and the pulverized soil brought into the required condition. By placing the harrow on the rubber, where it may be secured to the staples shown in the drawings, or by using the two rubbers alone, the earth may be compressed, as by a roller.

We are aware that harrows have been used with a roller following to prepare the ground for seeding, and do not claim, broadly, the combination with a harrow of an instrument for compacting the earth. Our machine is distinguished from others in the use of rubbers for breaking up the clods, in combination with a reversible harrow, to be twice passed over the field for completing the preparation of the soil.

What we claim as our invention, and desire to secure by Letters Patent, is—

In combination with one or more sliding rubbers, A, a reversible harrow, the teeth of which project on both sides of the beam, substantially as set forth.

In testimony whereof we have signed our names to this specification in the presence of two subscribing witnesses.

WILLIAM YOUNG.
JAMES WORTHAM.

Witnesses:
JAMES A. SMITH,
WILLIAM J. SMITH.